Oct. 25, 1955  C. V. O'MALEY  2,721,438
ROTARY POWER LAWNMOWER CUTTER
Filed Oct. 21, 1950
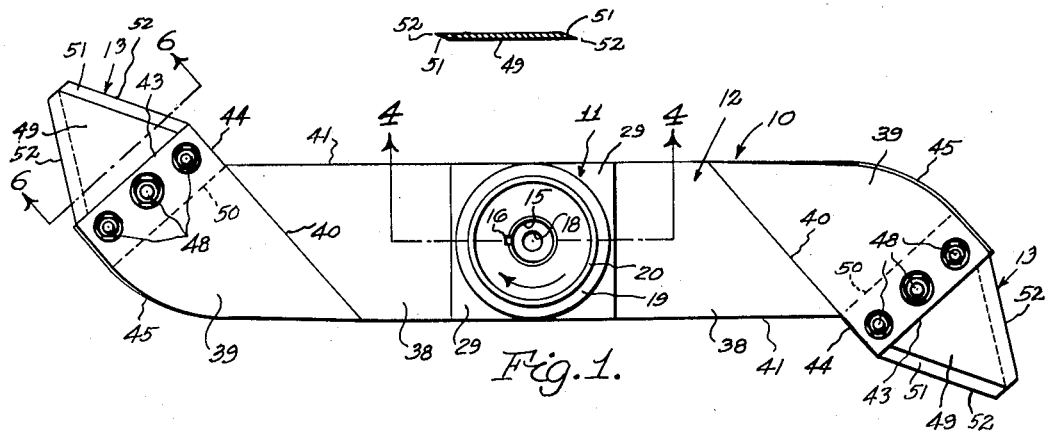
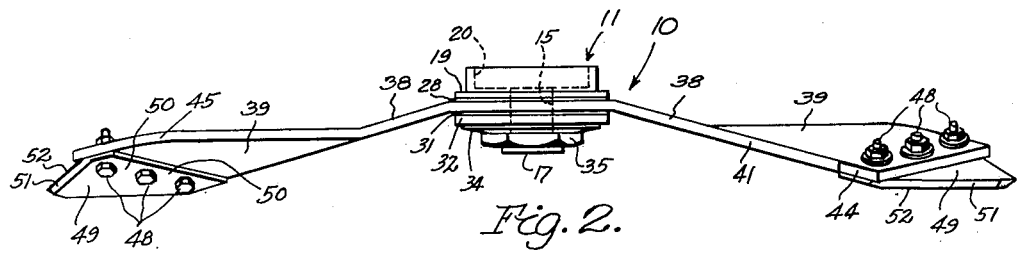
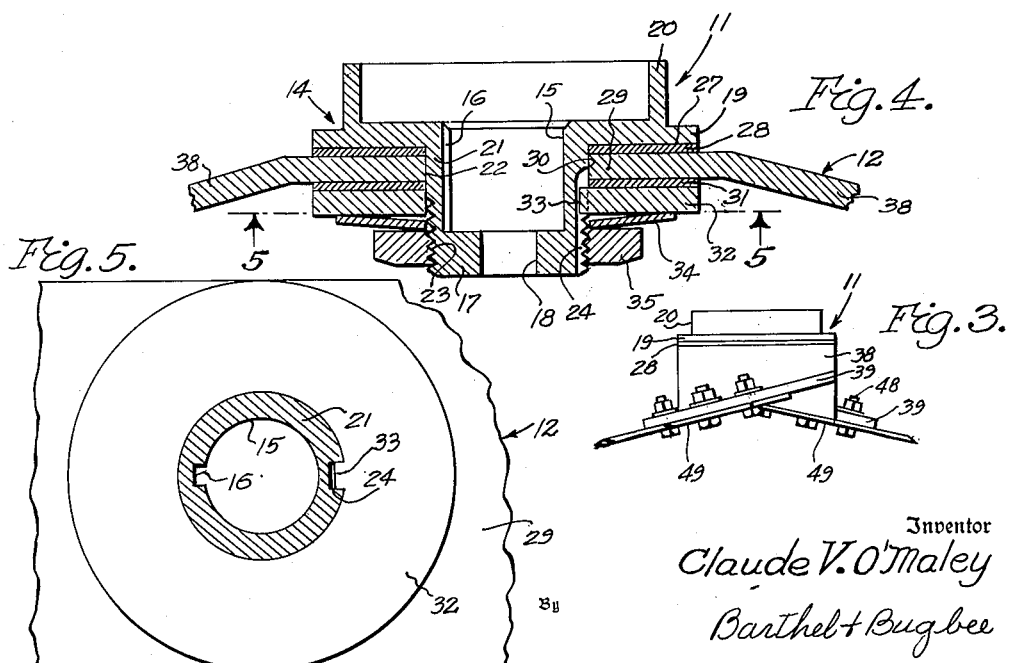
Inventor
Claude V. O'Maley
Barthel + Bugbee
Attorneys United States Patent Office 2,721,438
Patented Oct. 25, 1955

2,721,438

ROTARY POWER LAWNMOWER CUTTER

Claude Vincent O'Maley, Richmond, Ind., assignor to The Moto-Mower Company, Detroit, Mich., a corporation of Michigan Application October 21, 1950, Serial No. 191,474

1 Claim. (Cl. 56—295)

This invention relates to cutters and, in particular, to rotary power lawnmower cutters.

One object of this invention is to provide a rotary cutter for power lawnmowers of the horizontally-rotating type, namely the type which rotates approximately in a horizontal plane on a vertical axis of rotation, wherein the cutting blades are mounted with their cutting edges at an angle to the blade carrying arms so as to provide an improved angle of attack relatively to the grass to be cut, and thereby to enhance the efficiency of the lawnmower.

Another object is to provide a rotary cutter for power lawnmowers of the horizontally-rotating type wherein the cutting blades are detachably mounted so as to be not only renewable but also to be interchangeable between the opposite ends of the cutter, whereby the cutting edge at one end of the lawnmower becomes the idle edge at the opposite end and vice versa, so that double-edged blades, when dull, can be interchanged between the opposite ends of the cutter arms and the working life thus approximately doubled.

Another object is to provide a rotary cutter for power lawnmowers of the horizontally-rotating type wherein the rotary cutter bar which forms the arms to which the cutting blades are attached is of an improved configuration adapted to create the maximum amount of suction in an upward direction, so as to pull the grass upward, especially at that portion of the cutter which is disposed inwardly of the cutting blades.

In the drawing:

Figure 1 is a top plan view of a rotary cutter blade for horizontally-rotating power lawnmowers according to one form of the invention;

Figure 2 is a side elevation of the rotary cutter shown in Figure 1;

Figure 3 is an end elevation of the rotary cutter shown in Figure 1;

Figure 4 is an enlarged fragmentary vertical section through the hub of the rotary cutter shown in Figures 1 to 3 inclusive, taken along the line 4—4 in Figure 1; and Figure 5 is a horizontal section, looking upward along the line 5—5 in Figure 4.

Figure 6 is an enlarged sectional view taken along line 6—6 of Figure 1.

Referring to the drawings in detail, Figure 1 shows a rotary cutter, generally designated 10, according to the invention, for so-called horizontally rotating power lawnmowers wherein the cutter rotates in a circular path located in an approximately horizontal plane. The rotary cutter 10 consists generally of a hub structure 11 carrying a cutter bar 12 which in turn carries cutting blades 13 at its outer ends.

The hub structure 11 consists of a collar-like member 14 having a central bore 15 containing an axial keyway or groove 16 and having an end wall 17 in which a smaller bore or hole 18 is located, for the purpose of receiving the threaded lower end of the motor shaft (not shown) of which the bore 15 receives the main portion of the shaft and a key for providing the driving connection between the motor shaft and the collar 14. The collar 14 has a horizontally extending upper flange or disc portion 19 near the periphery of which rises a vertical flange or skirt 20. The latter serves to protect the motor bearings from the entry of dirt, grass and other foreign matter. The collar 14 also has a central tubular portion 21 with an outer cylindrical surface 22 (Figure 4) coaxial with the bore 15 and having screw threads 23 on its lower end. A keyway or axial groove 24 is formed in the outer surface 22.

The horizontal flange or disc portion 19 is provided with a contact surface or lower surface 27 which is engaged by an annular upper friction washer 28 mounted on the tubular portion 21, and which in turn is engaged on its under side by the central portion 29 of the cutter bar 12, the portion 29 having a central hole 30 for receiving the tubular portion 21 of the collar 14. The underside of the central cutter bar portion 29 is, in turn, engaged by a second annular friction washer 31 (Figure 4) which, in turn, is engaged on its under side by a relatively rigid annular washer 32 having a tooth or tongue 33 engageable with the keyway or axial groove 24. A spring washer 34 is located below the washer 32 and is urged against its lower surface by a nut 35 threaded upon the threaded portion 23 of the tubular portion 21. The spring washer 34 is of a shallow approximately conical shape so as to provide a yielding resilient action when the nut 35 is tightened, thus regulating the frictional engagement between the friction washers 28, 31 and the central portion 29 of the cutter bar 12. This construction is provided for the purpose of affording slippage of the cutter bar in the event it encounters an obstruction which halts it. This is a safety feature which prevents possible burning up of the driving motor.

Outwardly of the central portion 29 the cutter bar 12 is provided with downwardly bent intermediate portions 38 beyond which the end portions 39 of the cutter bar 12 are bent laterally in opposite directions (Figures 2 and 3) so that both are inclined downwardly to the direction of rotation, as indicated by the arrow in Figure 1. Moreover, the end portions 39 are bent relatively to the intermediate portions 38 along parallel bending lines 40 which are inclined relatively to the longitudinal axis of the cutter bar. The latter is a line passing through the axis of rotation and substantially parallel to the opposite edges 41 of the cutter bar 12, hence is substantially coincident with the central portion of the section line 4—4.

The end portions 39 of the cutter bar 12, in addition to being oppositely bent (Figure 2) are disposed with their center lines approximately parallel to one another and at obtuse angles to the said longitudinal axis or center line of the cutter bar 12 in directions substantially parallel to the bending lines 40 (Figure 1). The end portions 39 terminate in end edges 43 which are substantially perpendicular to the bending lines 40. The end portions 39 on their inner sides have edges 44 joining the edges 41 in an obtuse angle, and on their outer rearward edges are curved as at 45.

The extremities of the end portions 39 are bored to receive bolts 48, three being shown, for the attachment of the similarly bored cutting blades 13. The cutting blades 13 have approximately triangular outer portions 49 and approximately rectangular inner or base portions 50 by which the cutting blades 13 are secured to the end portions 39 of the cutter bar 12. The outer portions 49 are provided with beveled portions 51 which converge toward one another and provide cutting edges 52. The cutting edges 52 on the leading side of the cutting blades 13 are preferably angled so that their extensions pass approximately through the axis of rotation of the cutter 10, namely through the axis of the bore 15 of the hub structure 11. In other words, the center lines of the cutting blades 13, namely the bisectors of the angles between their cutting edges 51 and 52, are disposed at obtuse angles to the center line of the major portion of the cutter bar 12.

In the operation of the invention, the cutter 10 is placed on the lower end of the vertical motor shaft and secured in this position by a nut (not shown) threaded on the lower threaded portion of the motor shaft which passes through the hole 18 (Figure 4). The motor is rotated in the direction of the arrow in Figure 1, causing the cutter bar 12 to swing the cutting blades 13 in a circular path as the lawnmower is pushed forward over the lawn. At the same time, the suction created by the bent portions of the cutter bar 12 pulls the grass upward while it is being cut by the cutting edges 52 on the cutting blades 13. The latter may be said to hook their way into the grass as they swing through their circular paths, providing a very efficient cutting action, and the leading edge 52 of each cutting blade 13 is presented at the lowest point due to the tilt of the end portions 39 of the cutter bar.

What I claim is:

A rotary cutter for lawn mowers adapted to be rotated about a substantially vertical axis comprising a unitary bar having a substantially horizontally disposed central hub portion, intermediate portions disposed radially outwardly of said hub portion, the planes of said intermediate portions being tilted downwardly relatively to said hub portion, end portions disposed radially outwardly of said intermediate portions, the planes of said end portions being twisted axially of said bar, cutting blades secured to said end portions and disposed angularly with respect to the axis of said bar, each of said cutting blades having cutting edges converging outwardly, the leading edges thereof being on a line passing through the rotational axis of said hub portion.

References Cited in the file of this patent

UNITED STATES PATENTS

| | | |
|---|---|---|
| 1,876,504 | Rossiter | Sept. 6, 1932 |
| 2,232,671 | Loder | Feb. 18, 1941 |
| 2,295,072 | Blessing | Sept. 8, 1942 |
| 2,329,185 | Coddington | Sept. 14, 1943 |
| 2,477,442 | Cramer et al. | July 26, 1949 |
| 2,489,059 | Surgi | Nov. 22, 1949 |
| 2,489,730 | Soenksen | Nov. 29, 1949 |
| 2,504,259 | Ford | Apr. 18, 1950 |
| 2,549,317 | Laughlin | Apr. 17, 1951 |